United States Patent Office 2,872,860
Patented Feb. 10, 1959

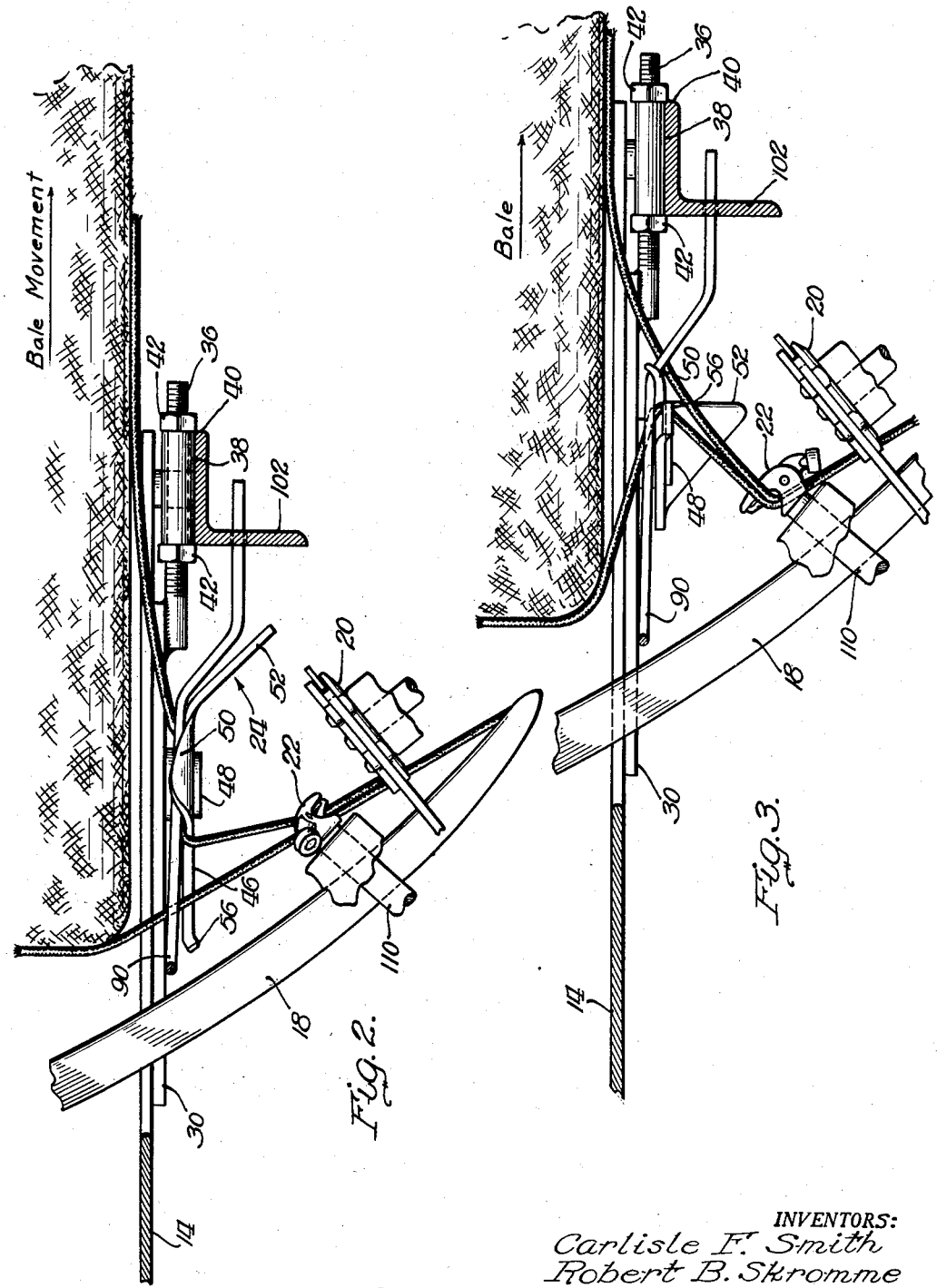

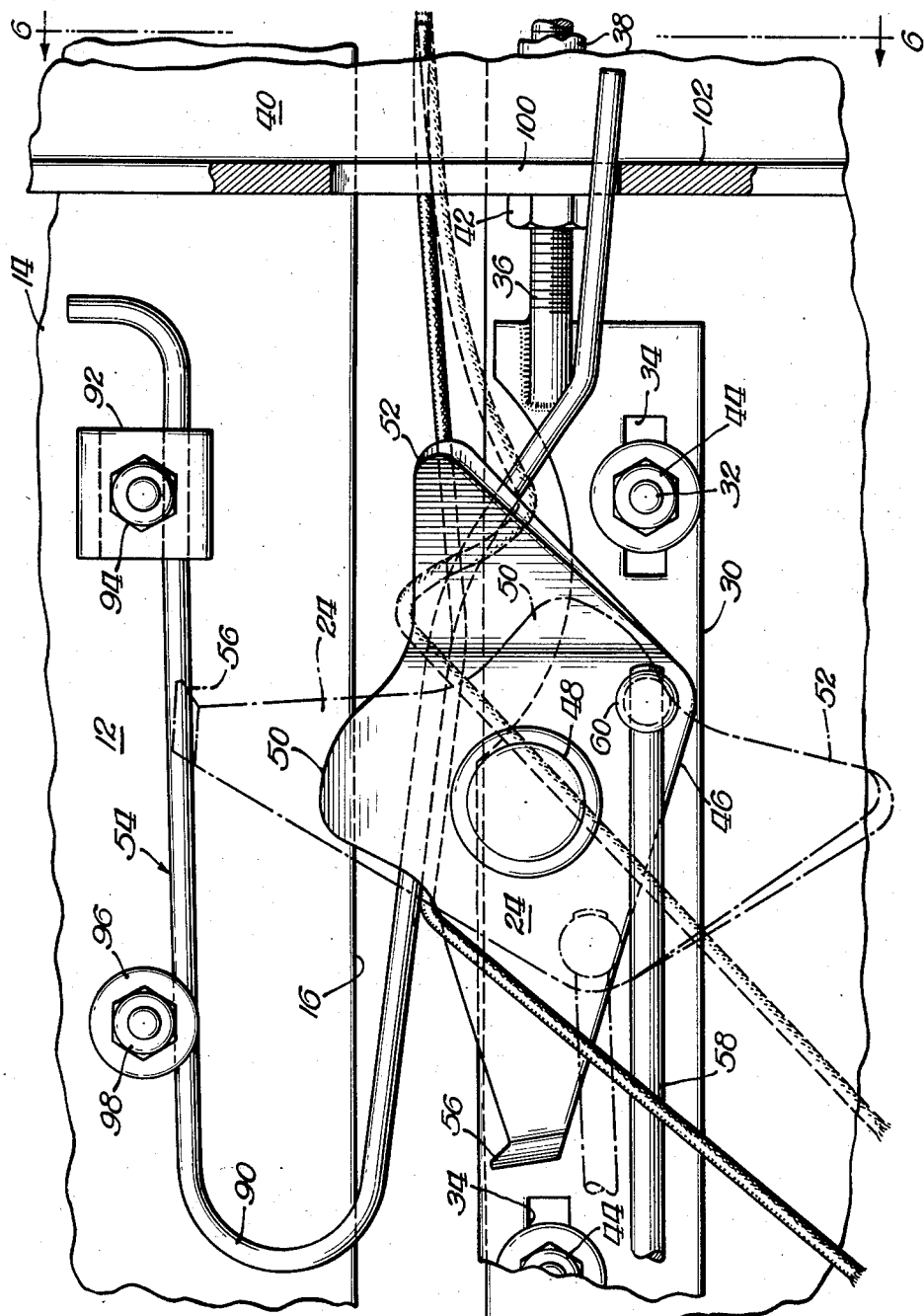

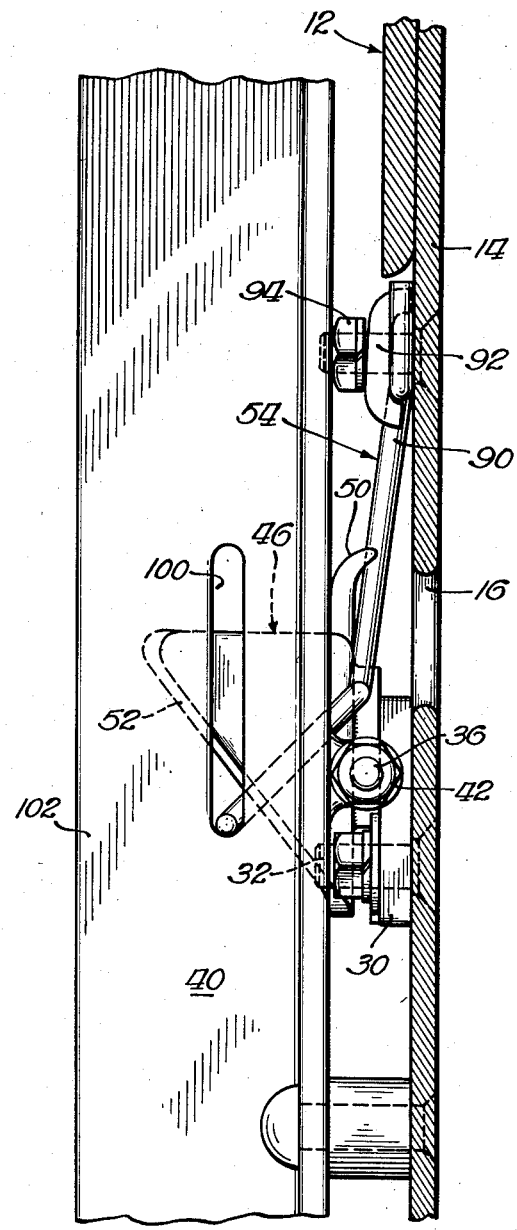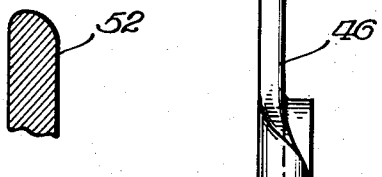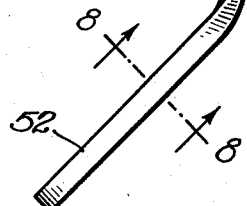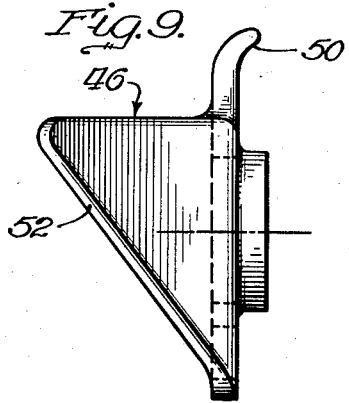

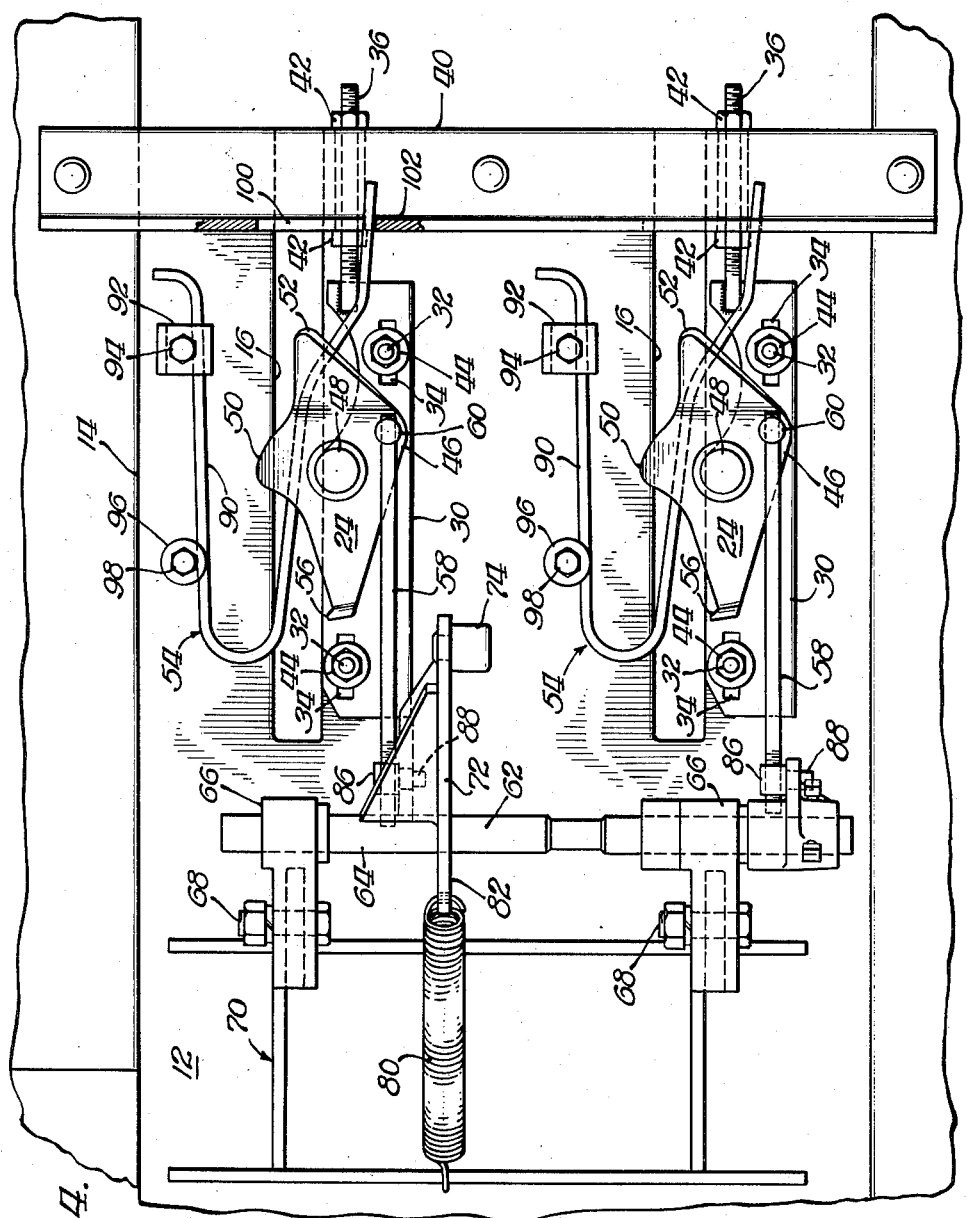

2,872,860

BALER TYING MECHANISM

Carlisle F. Smith, Knoxville, and Robert B. Skromme, Rockford, Ill., assignors to J. I. Case Company, Racine, Wis., a corporation of Wisconsin Application August 19, 1953, Serial No. 375,126

8 Claims. (Cl. 100—22)

The present invention relates generally to baler tying mechanism, and is particularly directed to an improved twine guide arrangement which provides additional slack twine for the tying mechanism during a selected period of the knot tying operation.

The automatic baling of materials with the use of a flexible strand, such as twine, poses certain problems which have not been satisfactorily solved by the prior art. The successful completion of a knot in the strand, while the bale is compressed without breaking the strand and without leaving a loop which is too loose to properly hold the bale is a difficult accomplishment, and is even more difficult to constantly achieve through numerous repeated operations of the tying mechanism. One of the most troublesome problems in knot tying mechanism of this type is how to present sufficient slack to the knotter at the proper time to best insure satisfactory completion of the knot tying operation.

The primary object of the present invention is to provide a novel and improved form of guide means for a baling strand, which is operable to afford an additional length of the strand for use during the knot tying operation. Other objects and advantages will become apparent as the disclosure progresses with respect to the accompanying drawings, wherein:

Fig. 2 is a plan view, partly in section, of apparatus embodying the present invention.

Fig. 3 is a view similar to Fig. 2, illustrating another position of portions of the structure.

Fig. 4 is a fragmentary side view of a baling chamber having the improved twine guide means mounted thereon, the tying mechanism being omitted to more clearly show the arrangement of the guide means.

Fig. 5 is an enlarged, fragmentary view of one of the guide means in Fig. 4, the alternate position of the twine and the tucker-finger being shown in broken lines.

Fig. 6 is a view taken along line 6—6 in Fig. 5.

Fig. 7 is a plan view of the tucker-finger shown in Fig. 5.

Fig. 8 is an enlarged, partial section taken along the line 8—8 in Fig. 7.

Fig. 9 is an end view of the structure in Fig. 7.

Figure 1:
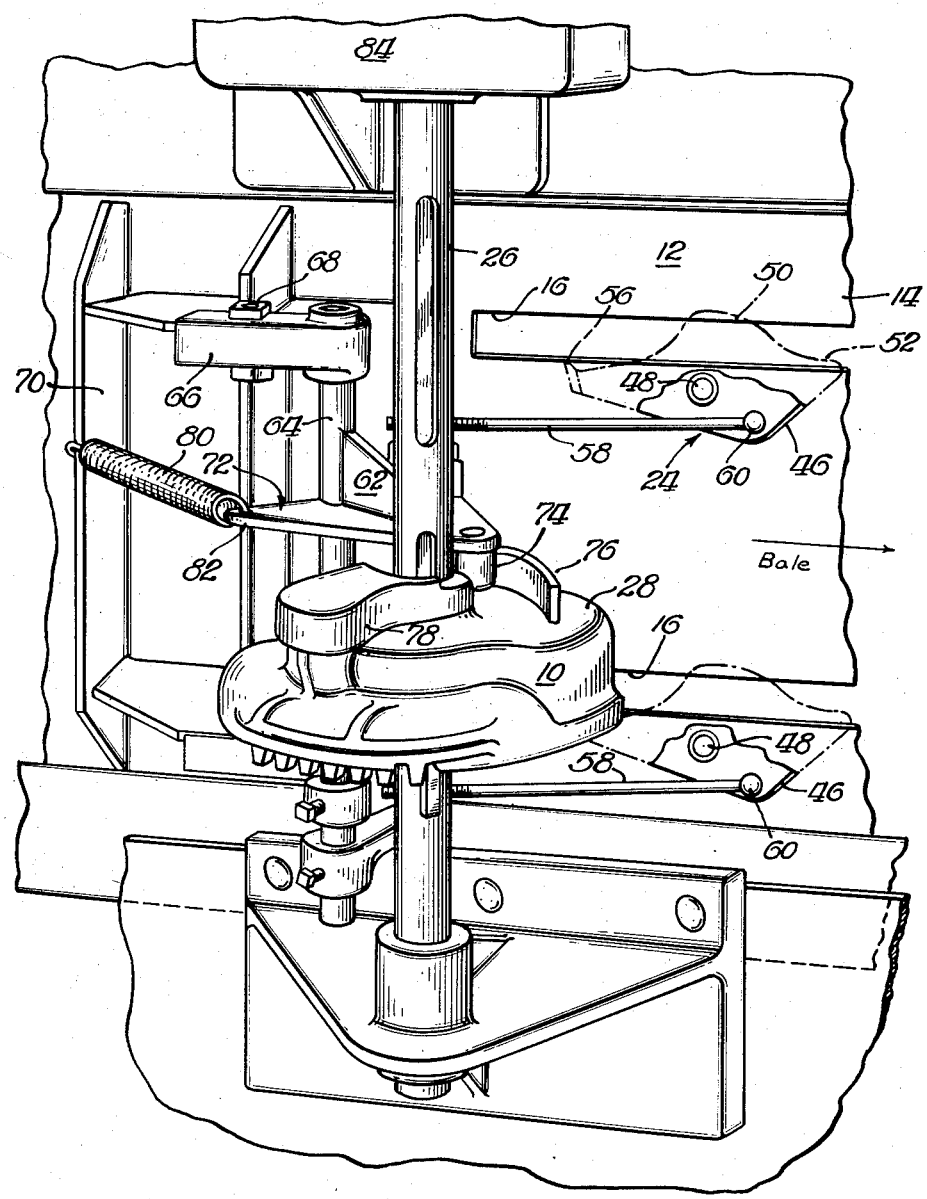
Fig. 1 is a side view, in perspective, of an embodiment of the present invention, with parts omitted or broken away in the interest of clarity.

Referring to the drawings, it is seen that the present invention is illustrated in connection with a tying mechanism 10 attached to the side of a baling chamber 12, the latter having the usual plunger mechanism (not shown) for compressing material into bale form. The side of the baling chamber adjacent the tying mechanism includes a side panel member 14 having a pair of vertically spaced, elongated horizontal slots 16 therein affording passage of the needles 18 (Fig. 2) across the chamber to a twine holder 20. The needles 18 carry a strand of twine or the like, which is looped around the bale, and the two ends of the strand are suitably fixed in the holder 20 in position for formation of a knot therein through operation of means including the bill-hook 22. Adjacent each of the needle slots 16 is the improved twine guide or tucker finger assembly 24 comprising the present invention.

Generally, the twine tying mechanism 10 includes a clutch controlled vertical shaft 26 adapted to carry a pair of knot tying mechanisms each comprising a cam wheel 28 (Fig. 1) for controlling operation of the tying elements which include the twine holder 20 and a bill-hook 22 (Fig. 2). The cam wheel 28 is shown to illustrate its relationship to the tucker finger assembly 24, other details of the knot tying mechanisms having been omitted as unnecessary for a full disclosure of invention. A more detailed description of the twine tying mechanism 10 may be found in co-pending application Serial No. 375,125, which issued May 28, 1957, as U. S. Patent No. 2,793,890, also assigned to the assignee of the present invention.

The tucker-finger assembly 24, as seen particularly in Fig. 4, comprises a supporting plate 30 which is adjustably positioned on the panel 14 by a pair of bolts 32 disposed through slotted openings 34 in plate 30. At one end of the plate 30 there is provided an incremental adjusting means for positioning the plate along the slot 16, including a threaded rod 36 fixed at one end to the plate, as by welding, which extends through a sleeve 38 fixed to the frame member 40 and is held in axial position relative to the sleeve by a pair of nuts 42 positioned on the threaded rod at each end of the sleeve. Consequently, by loosening the nuts 44 on the bolts 32, a fine adjustment of the position of the plate 30 along the needle slot 16 can be achieved through movement of the nuts 42 on rod 36.

A tucker-finger 46 is rotatably supported on the plate 30 by means of a pin 48 which extends outwardly from the plate and through an opening (not shown) in an intermediate portion of the tucker-finger 46. As seen particularly in Figs. 7–9, the tucker-finger 46 comprises a generally triangular, elongated plate member having an edge disposed along the needle slot 16 in the baling chamber and including an intermediate projecting flange portion 50. The rearward section 52 of the tucker-finger, that is, the section extending in the direction of movement of the bale through the baling chamber 12, is curved outwardly from the baling chamber to provide clearance for a spring twine guide 54. The forward end of the tucker-finger includes a vertically extending tip portion 56 for assisting in maintaining the twine in position on the tucker-finger, as will be more clearly seen hereinafter.

The downwardly extending vertex portion of the tucker-finger 46 is pivotally connected to an elongated connecting rod 58 by a pin 60. The rod 58 (Fig. 4) extends forwardly along the baling chamber to a pivotal connection with a tucker-finger operating means 62. More particularly, the operating means 62 comprises a vertical shaft 64 which is supported at either end by a pair of journal bearings 66 which are fixed, as by bolts 68, to a frame structure 70 secured to the side of the baling chamber 12.

An intermediate section of the vertical shaft 64 has fixed thereto a laterally extending, generally triangular shaped arm 72 having a roller 74 mounted at one apex of the triangle for rotation about a vertical axis. The roller 74 engages the upper surface of the cam wheel 28 for movement relative thereto in a path defined by a vertically projecting guide plate 76 and a cam lever 78 disposed on the upper surface of the cam wheel. A coil spring 80, which is secured between the other projecting apex 82 of arm 72 and the frame 70, biases the roller 74 into engagement with the guide plate 76 and the cam lever 78. Consequently, as the cam wheel 28 is rotated, through operation of suitable clutch-controlled mechanism indicated generally at 84 in Fig. 1, the roller 74 is guided by the plate 76 and lever 78 to move back and forth in an arc, thereby providing oscillating rotation of the shaft 64 which is transmitted through the connecting rod 58 to the tucker-finger 46 and causes the latter to rock back and forth about the pin 48.

It will also be noted in Fig. 4, that the effective length of the connecting rod 58 is adjustable to selectively vary the length of the arc of movement of the tucker-finger 46. A forward portion of the rod is threaded and engages an internally threaded sleeve portion 86 of a pivot pin 88 which is carried by the arm 72. Accordingly, the rod 58 may be adjustably positioned in the sleeve 86 to accommodate a longitudinal shift in the position of the tucker-finger support plate 30 or to change the length of the path of the swinging movement of the tucker finger 46.

The spring twine guide 54 (Figs. 4 and 5) referred to above comprises a metal rod 90 which is bent in a generally U-shaped form with one leg clamped to the bale chamber 12 and the other leg extending across the needle slot 16 in closely adjacent relation to the tucker-finger 46 for cooperation therewith in guiding the twine through a portion of its path around the bale. A clamp 92 is secured to the baling chamber by a bolt 94 and embraces one end portion of the rod 90 to secure the latter against the chamber 12. A washer 96, held in place by a bolt 98, engages another section of the rod 90 to assist in the clamping action. The fixed end of the spring rod 90 is turned upwardly to lie along the baling chamber panel 14 in order to prevent axial rotation of the rod.

The free leg of the U-shaped rod 90 extends downwardly across the needle slot 16 (Figs. 5 and 6) and curves outwardly adjacent the rearward end of the tucker finger 46 in close relation to the latter. The free leg of the rod terminates within a vertically slotted opening 100 formed in an outwardly extending flange portion 102 and the baling chamber frame member 40, thereby affording spring movement of the rod in a vertical direction while restricting the lateral movement of the rod.

The operation of the baler will be described with respect to but one of the tucker-finger assemblies 24, inasmuch as the pair of assemblies are identical in structure and function. In the formation of the bale the needle 18 moves through the slots 16 on either side of the baling chamber 12 to place a section of twine in the twine disk holder 20 (Fig. 2). The path of the needle carries the end of the twine under the spring twine guide 54 and over the upper edge portion of the front of the tucker-finger 46, the tip 56 serving to prevent the twine from sliding forwardly off the tucker-finger and the protecting portion 50 restraining the twine against movement rearwardly of the tucker-finger.

As the bale is formed and moves rearwardly in the baling chamber, the twine loop moves with the bale. The twine end held by the disk holder 20 is held in position alongside the bale by virtue of its placement between the upper edge of the tucker-finger 46 (forwardly of the vertical projection 50, i. e. to the left of the drawings) and the spring twine guide 54, as seen in full in Fig. 5. When the bale is completed, the needle 18 again moves through the slot 16, over the front edge of the tucker-finger 46, to deposit the other end of the loop in the twine holder 20 (Fig. 2). At this point, the clutch operated drive means 84 (Fig. 1) is tripped to actuate the tying mechanism 10. The shaft 26 is rotated, carrying with it the cam wheel 28, and the bill-hook 22 which engages the double strand of twine adjacent the holder 20 begins to turn about the axis of its supporting shaft 110 to form a loop in the twine (Figs. 2 and 3).

As the bill-hook 22 rotates it twists a length of the double strand of twine adjacent the holder 20. It is necessary that the slack twine used by the bill-hook be taken from around the bale, since obviously any excess tension on the short section of twine between the bill-hook and twine holder 20 will cause the twine to break. The present tucker-finger arrangement provides the necessary additional slack for forming the knot. As the bill-hook starts to rotate, in response to rotation of the cam wheel 28, the roller 74 (Fig. 1), which has moved along the cam lever 78 during the previous steps of the tying operation, moves around the outer end of the cam lever 78. The resulting sharp change in the direction of movement of the roller 74 effects a rotation of the shaft 64 which shifts the connecting rod 58 longitudinally and causes the tucker-finger 46 to move clockwise through an angle of about 90° (Figs. 3 and 5) and then counterclockwise to resume its normal position.

The oscillating movement of the tucker-finger 46 effects a "dumping" of the strand of twine which extends around the rearward end of the bale, and thereby provides sufficient additional slack in the loop to allow a knot to be tied without unduly straining or breaking the twine. As the tucker-finger 46 is moved to the position shown in Fig. 3, the rear strand slides rearwardly along the upper edge of the tucker-finger and over the curved edge of the flange 50 on to the edge of the rearward tucker-finger section 52. Meanwhile, the tip 56 prevents the forward strand of twine from moving upwardly off the front of the tucker-finger. Also, the curved forward end of the spring twine guide member 90 prevents the rearward strand from moving out of position with respect to the tucker-finger 46.

As the tucker-finger 46 moves back to its normal position (full line in Fig. 5) the rearward strand of twine is retained on the rearward edge 52 of the tucker-finger in advance of the vertically projecting flange 50 with the strand underlying the rearward end of the spring twine guide 90, as shown by broken lines in Fig. 5. This shift in position of the twine, which has been afforded by the operation of the tucker-finger, provides sufficient additional slack to enable the bill-hook 22 to complete its knot tying operation without the danger of breaking the twine. Furthermore, the oscillating movement of the tucker-finger 46 is timed with the knot tying mechanism, through the cam wheel 28 so that the loop around the bale is held taut until the moment that the slack is needed and then the rearward strand is dumped to provide the additional slack.

It is seen, therefore, that the present invention provides means which affords definite advantages in the automatic tying of compressed materials. And, although illustrated and described with respect to the hay baler, it will be apparent that the principles of the invention may have other uses and that other forms of the invention may be made without departing from the novel principles disclosed herein.

We claim:

1. In a baler having a baling chamber, means for encircling a bale with a tying strand, and tying means adjacent said baling chamber for forming a knot in the ends of the tying strand, an improved strand guide means positioned between the baling chamber and the tying means, said guide means comprises a member having an edge disposed generally transversely of the path of the strand extending between the tying mechanism and the baling chamber for engagement with the strand, said edge including a projecting mid-portion, and means supporting said member for rotation through a path generally transversely of the strand engaged thereby, whereby a strand engaged by one section of said edge is restrained by said projecting mid-portion from movement therepast along said edge, and whereby rotation of said member affords movement of said strand past said projecting mid-portion on to the other section of said edge to thereby present additional slack in the strand for use in forming the knot.

2. In a baler having a baling chamber, means for encircling a bale with a tying strand, and tying means adjacent said baling chamber for forming a knot in the ends of the tying strand, an improved strand guide means disposed between the baling chamber and the tying means, said guide means comprising an edge disposed generally transversely of the path of the ends of the strand extending between the tying mechanism and the baling chamber for engagement with the strand ends, said edge including a projecting mid-portion for restraining the portion of the strand which extends along the adjacent side of the baling chamber toward the leading end of the bale, means supporting said member for rotation in a path generally transversely of the strand ends engaged thereby, and means for oscillating said member through an arc in said path of rotation, whereby said restrained portion of the tying strand is released to move over said projecting mid-portion toward the leading end of the ball to a position on a section of said edge spaced from the section initially engaged by said strand, thereby presenting additional slack in the strand for use in forming the knot.

3. In a baling chamber having a pair of aligned openings through opposite sides thereof, means movable through said aligned openings for encircling a bale with a tying strand, and tying means adjacent one of the openings in said baling chamber for forming a knot in the ends of the tying strand, an improved strand guide means comprising a supporting plate disposed on the side of the baling chamber in adjacent relation to the opening facing the tying means, means securing said supporting plate to the baling chamber in a manner affording adjustment of the plate fore and aft along the chamber, a guide element mounted on said supporting plate for rotation about an axis normal to said plate, said guide element having an edge portion including an intermediate projection, and means connected with said guide element for rotation thereof about its axis between a first position wherein said edge portion extends generally in the direction of the longitudinal axis of the baling chamber and opposite the adjacent opening therein and a second position generally at right angles to said first position.

4. In a baling chamber having a pair of elongated slots through opposite sides thereof extending longitudinally of the baling chamber, means movable through said slots for encircling a bale with a tying strand, and tying means adjacent one of the slots in the baling chamber for forming a knot in the ends of the tying strand, an improved strand guide means comprising a guide element mounted on the side of the baling chamber between said tying means and the adjacent slot in the chamber for rotation about an axis generally transverse to the longitudinal axis of the baling chamber, said guide element having an edge portion normally disposed along said slot and extending in the same direction, said edge portion having a projection formed intermediate the ends thereof and having one end section curving away from the baling chamber, means for rotating said guide element relative to said normal position, and a guide rod yieldably fixed on said baling chamber in generally coextensive, adjacent relation to said guide element, said guide rod being positioned between said guide element and said baling chamber in position for preventing displacement of the tying strand with respect to said guide element.

5. In a baler having a baling chamber, means defining an elongated slot along a side wall of said baling chamber, tying means externally of said baling chamber adjacent the elongated slot, and a needle carried by said baler and movable through said baling chamber to pass a tying strand across said chamber and through the elongated slot to said tying means, an improved strand guide means positioned between the elongated slot in the baling chamber and the tying means, said guide means comprising a member presenting an edge normally disposed generally transversely of the path of the needle as it passes through the elongated slot in the baling chamber to the tying mechanism, said edge including a projecting mid-portion extending transversely of the elongated slot, supporting means for said member affording rotation thereof through a path generally transversely of the path of the needle, whereby a strand carried through the baling chamber by said needle to said tying means is initially engaged by one section of said edge and retained in position therealong by said projecting mid-portion, and whereby the rotation of said member permits the strand to pass over said projecting mid-portion to another section of said edge to provide additional slack for the tying mechanism, and means for restraining movement of the strand away from said guide member comprising an elongated, resilient element fixed in position intermediate said guide member and the elongated slot in said baling chamber, said elongated element including a section generally coextensive with the edge of said guide member in its normal position and being generally aligned with said edge and the elongated slot.

6. An improved tying-strand guide means for use with a baler comprising, a support means, a guide element pivotally mounted on said support means for rotation about a transverse axis, said guide element including a strand-engaging edge having a projecting midsection forming a hump along said edge, the portion of said edge on one side of said hump curving laterally away from said support means, a resilient guide rod secured in generally coextensive, adjacent relation to said guide element and including a curved end portion generally following the direction of said curved edge of said guide element, and means connected with said guide element for effecting rotation thereof about said transverse axis.

7. In a baler having a baling chamber, means for encircling a bale with a tying strand, and means adjacent the baling chamber for forming a knot in the two ends of the tying strand, an improved strand guide means positioned between the baling chamber and the tying means, said guide means including a first section for engaging the two ends of the tying strand which extend between the baling chamber and the tying means, said first section terminating at a projecting mid-portion of the guide means which is effective to restrain said strand ends engaged by said first section against movement rearwardly along the baling chamber in the direction of bale movement, said guide means including a second section which is separated from said first section by said projecting mid-portion, and means affording pivotal movement of said guide means about an axis extending generally transversely of the direction of bale movement and at a position generally intermediate said first and second sections, whereby movement of the said guide means in the direction of travel of a bale through the baling chamber affords a release of one end of the tying strand from said first section of the guide means to said second section thereon spaced rearwardly along the baling chamber, to thereby provide additional slack in the tying strand for use by the tying means.

8. In a baler having a baling chamber, means for encircling a bale with a tying strand, and tying means adjacent said baling chamber for forming a knot in the ends of the tying strand, an improved strand guide comprising an element having an edge disposed generally transversely of the path of the ends of the strand which extends between the tying mechanism and the baling chamber and in position for engagement with the two strand ends, said edge of said element including a projecting mid-portion for restraining the portion of the strand which extends rearwardly along the adjacent side of the baling chamber in the direction of the leading end of the bale, a rearward end section of said element which curves outwardly from the baling chamber, and said element including a projecting tip portion disposed along said edge in forwardly spaced relation to said projecting mid-portion, means supporting said element for rotation in a path generally parallel to the longitudinal axis of the baling chamber, and means for oscillating said element through an arc in said path of rotation, whereby rotation of said element in a direction toward the rearward end of the baling chamber is effective to release said portion of the tying strand on said edge to move past said projecting mid-portion to a position on said rearward end section, said tip portion preventing displacement of the other end of the strand relative to said guide element, and whereby the return of said element to its initial position presents the two ends of the tying strand in spaced relation to each other to thereby provide additional slack for use by the tying means.

References Cited in the file of this patent

UNITED STATES PATENTS

| | | |
|---|---|---|
| 274,870 | Whiteley et al. | Mar. 27, 1883 |
| 307,176 | Buxton | Oct. 28, 1884 |
| 378,815 | Whiteley | Feb. 28, 1888 |
| 2,403,396 | Raney | July 2, 1946 |
| 2,649,043 | Jones et al. | Aug. 18, 1953 |
| 2,651,252 | Pope | Sept. 8, 1953 |
| 2,662,468 | Shenigo | Dec. 15, 1953 |

UNITED STATES PATENT OFFICE
CERTIFICATE OF CORRECTION

February 10, 1959

Patent No. 2,872,860

Carlisle F. Smith et al.

It is hereby certified that error appears in the printed specification of the above numbered patent requiring correction and that the said Letters Patent should read as corrected below.

Column 5, line 22, for "ball" read -- bale --.

Signed and sealed this 9th day of June 1959.

(SEAL)
Attest:

KARL H. AXLINE
Attesting Officer

ROBERT C. WATSON
Commissioner of Patents